United States Patent [19]

Bennett

[11] 3,907,453
[45] Sept. 23, 1975

[54] CUTTING TOOL HOLDER
[75] Inventor: Gene Lee Bennett, North Madison, Ohio
[73] Assignee: Genio Tools, Inc., Mentor, Ohio
[22] Filed: Aug. 3, 1972
[21] Appl. No.: 277,636

[52] U.S. Cl.............. 408/199; 29/97 R; 144/237; 408/239
[51] Int. Cl............................................ B23b 29/03
[58] Field of Search.......... 408/199, 146, 198, 239, 408/240; 144/237; 29/97 R, 102 R, 103 R

[56] References Cited
UNITED STATES PATENTS

| | | | |
|---|---|---|---|
| 1,477,651 | 12/1923 | Koeln | 29/102 |
| 1,533,547 | 4/1925 | Hathaway | 144/237 |
| 2,013,899 | 9/1935 | Roco | 29/103 |
| 2,135,819 | 11/1938 | Klix | 29/103 |
| 3,103,675 | 9/1963 | Vaughn | 29/103 |
| 3,433,104 | 3/1969 | Milewski et al. | 29/103 |

Primary Examiner—Andrew R. Juhasz
Assistant Examiner—F. R. Bilinsky
Attorney, Agent, or Firm—Meyer, Tilberry & Body

[57] ABSTRACT

A cutting tool holder comprising an elongated holder body having a shaft receiving bore extending longitudinally therethrough, an elongated tool mounting shaft adapted to receive at least one cutting tool in a fixed position thereover and means for releasably retaining the mounting shaft in position within the holder body. The holder body is affixed to a metal removal or cutting machine by convenient conventional means with cutting tool positioned relative to a workpiece as desired. The holder may include means which permit a plurality of cutting tools to be simultaneously mounted on the shaft to accommodate the performance of a plurality of metal removal operations. The tool holder may also conveniently include a micrometer-like arrangement between the mounting shaft and holder body to provide indication means as to relative location of the cutting tool from a first normal position and means for supplying a continuous coolant fluid flow to the cutting tool.

9 Claims, 18 Drawing Figures

CUTTING TOOL HOLDER

This application pertains to the art of metal removal tools and more particularly to a metal removal tool holder.

The invention is particularly applicable to a tool holder for grooving tools for either internal or external grooving operations and will be described with particular reference thereto; however, it will be appreciated by those skilled in the art that the invention has broader applications and may be used with other metal removal or cutting tools aside from those normally employed for grooving operations.

Heretofore, in performing grooving operations, the grooving tools have been generally rigidly affixed to an elongated tool mounting shaft. The tool mounting shaft was then slideably received in an elongated shaft receiving bushing or sleeve for mounting in the metal removal machine itself. Oftentimes the shaft receiving bushing or sleeve merely comprised a split-sleeve type of bushing wherein no means were provided to positively locate the tool mounting shaft therein. This was particularly disadvantageous when it became necessary to remove the tool mounting shaft from the bushing for purposes of re-sharpening the cutting tools themselves. Upon replacement in the metal removal machine, it was then necessary to repeat the steps of properly positioning the tool mounting shaft in order that the cutting tools would be in the desired location relative to the workpieces themselves. This is particularly important when a plurality of identical workpieces are to be sequentially processed as, for example, on a production line.

A further difficulty with this prior type of cutting tool mounting arrangement was that the cutting tools themselves were rigidly affixed to the tool mounting shafts. Thus, if a tool broke or was merely worn out, it became necessary to replace both the cutting tool and tool member mounting shaft. Also, if a different type or size of cut was desired, still further cutting tool member mounting shaft combinations were required. This requirement necessitated a substantial stock piling of equipment in order that a machine shop could efficiently and properly function. This particular problem was apparent with both single and multiple cutting point arrangements wherein both the size and spacing of the cutting tools were of substantial significance.

The present invention contemplates a new and improved device which overcomes all of the above referred problems and others and provides a new cutting tool holder which is simple, economical, and versatile in order to facilitate interchanging of cutting tools in a single tool holder.

In accordance with the present invention, there is provided a cutting tool holder for maintaining at least one cutting tool in a desired spaced relationship relative to a workpiece as the tool and workpiece are engaged for performing a cutting operation. The holder comprises an elongated holder body having a longitudinal axis and first and second spaced apart end faces, the holder body further including a first coaxial bore extending therethrough and locating flat portions on the outside thereof, the flats serving to adapt the holder body to be readily affixed to a conventional metal removal machine. An elongated tool mounting shaft having a first tool mounting portion and including means for rigidly affixing the at least one cutting tool thereto and a second shaft mounting portion is dimensioned to be slideably received in the first bore from the first end face so as to extend substantially longitudinally through the holder body. Means are provided for engaging the second shaft mounting portion adjacent the second end face of the holder body in order to retain the tool mounting shaft in a desired position within the bore. Locking means disposed in the holder body are provided for locking the mounting shaft in a desired position relative thereto.

In accordance with another aspect of the present invention, means received in the bore of the holder body and over the mounting shaft are provided to continuously bias the mounting shaft longitudinally of the holder body.

In accordance with another aspect of the present invention, the mounting shaft is selectively rotatable within the holder body and the body and mounting shaft further include means thereon for indicating the relative positions thereof from a first normal position through one revolution therebetween.

In accordance with another aspect of the present invention, there is included means for supplying a continuous fluid flow to the at least one cutting tool.

In accordance with still another aspect of the present invention, means may be provided for selectively longitudinally moving the mounting shaft relative to the holder body.

In accordance with still another aspect of the present invention, there is provided a new cutting tool member particularly adapted for use with a tool holder of the type including an elongated holder body adapted to be affixed to a conventional metal removal machine and wherein the body has an elongated tool mounting shaft extending coaxially outward therefrom. The tool member comprises a mounting portion dimensioned to be closely received in a desired position relative to the mounting shaft and a tool element portion rigidly affixed to the mounting portion to extend generally radially outward therefrom, the element including a cutting surface generally disposed at the outermost end thereof.

The principal object of the present invention is the provision of a cutting tool holder which permits repeated accurate location of a cutting tool relative a metal removal apparatus and a workpiece.

Another object of the present invention is the provision of a cutting tool holder which is simple in design.

Still another object of the present invention is the provision of a cutting tool holder which is easy to manufacture.

A further object of the present invention is the provision of a cutting tool holder which facilitates the use of a plurality of different cutting tools therewith.

Still another object of the present invention is a provision of a cutting tool holder which is readily adaptable to use in a plurality of metal removal operations.

Still another object of the present invention is the provision of a cutting tool holder which permits removal and relocation of the cutting tool relative thereto in a precise manner.

Yet another object of the present invention is the provision of a cutting tool member which provides a rigid tool and mounting structure and which is easily removable from the tool mounting shaft for maintenance and repair.

The invention may take physical form in certain parts and arrangements of parts, a preferred embodiment of which will be described in detail in this specification and illustrated in the accompanying drawings which form a part hereof and wherein:

FIG. 8 is a longitudinal cross sectional view of the tool holder of FIG. 7;

FIG. 9 is a cross sectional view taken along lines 9—9 of FIG. 7;

FIG. 10 is a cross sectional view taken along lines 10—10 of FIG. 8;

FIG. 17 is a tool member formed in accordance with the concepts of the subject invention; and, FIG. 18 is an alternative arrangement of the tool member shown in FIG. 17 including chamferring tools disposed on either side thereof.

Referring now to the drawings wherein the showings are for purposes of illustrating the preferred embodiment of the invention only and not for purposes of limiting same, the FIGURES show a tool holder body A, a tool mounting shaft B, a tool mounting shaft engaging means C, a cutting tool member D and a mounting shaft biasing means E.

Referring now more particularly to FIGS. 1–6, it will be seen that tool holder body A is comprised of an elongated body 20 having a first end face 22 and a second end face 24. A bore 26 extends longitudinally through the body between first and second end faces 22, 24. Bore 26 includes a first, enlarged bore portion 28 extending inwardly from end face 24 and a second, smaller bore portion 30 extending inwardly from first end face 22 to join portion 28. As can best be seen in FIG. 3, the enlarged bore portion extends substantially the length of body 20. Disposed on the outer peripheral surface of body 20 and extending generally longitudinally therealong are locating flats 32, 34, 36 and 38 of the type known for use in machine tools for locating purposes. For reasons which will hereinafter become apparent, a pair of set screws 42, 44 are threadably received in body 20 generally midway between the first and second end faces so as to extend through the side walls thereof into enlarged portion 28 of bore 26. Similarly, a set screw 46 conveniently threadably extends through body 20 into bore portion 30 adjacent first end face 22 for reasons which will also hereinafter become apparent. A keyway 48 is included in the holder body to extend longitudinally along and inwardly of smaller bore portion 30.

Figure 1:
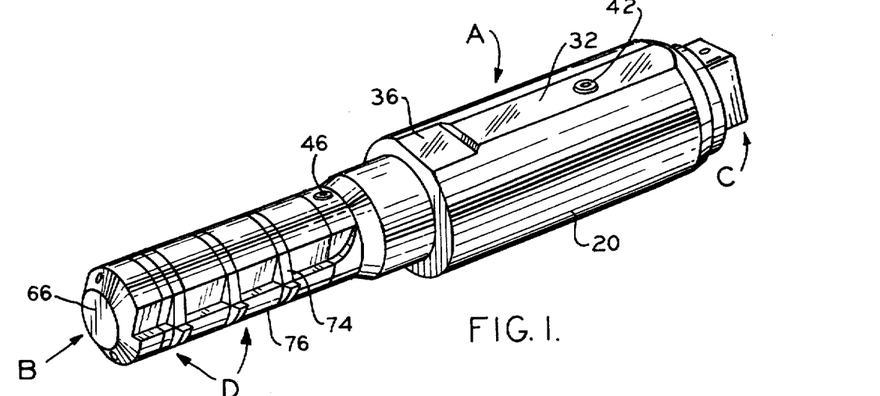
FIG. 1 is a perspective view of the subject new tool holder.
Figure 2:
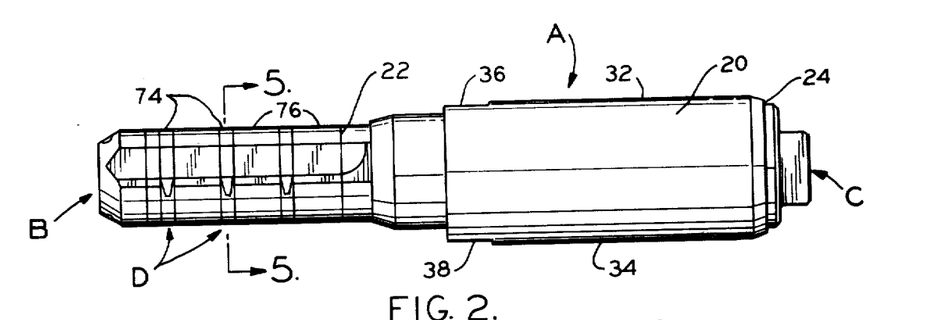
FIG. 2 is a side elevation of the tool holder shown in FIG. 1.
Figure 3:
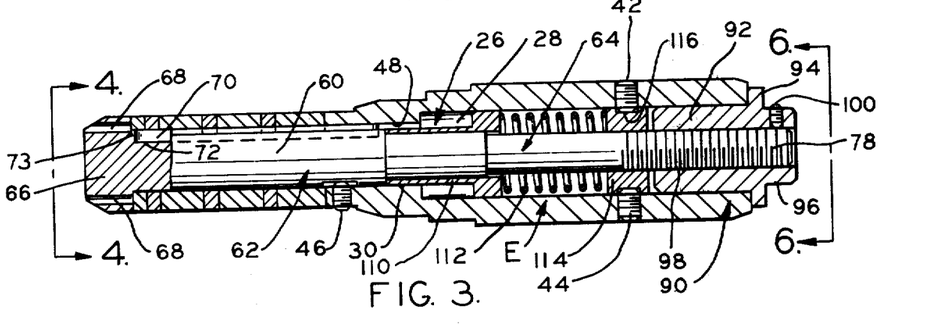
FIG. 3 is a longitudinal cross sectional view of the tool holder shown in FIG. 2.
Figure 4:
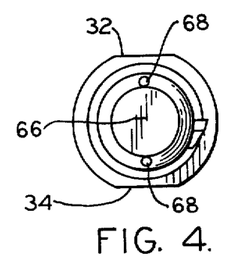
FIG. 4 is an end view taken in the direction of lines 4—4 in FIG. 3.

Tool mounting shaft B is comprised of an elongated shaft 60 having a first tool mounting portion 62 and a second shaft mounting portion 64. The diameter of the tool mounting portion is such that it is receivable in a close-fitting sliding relationship in smaller diameter bore portion 30. Disposed adjacent the outermost portion of the tool mounting portion of the shaft is an enlarged end collar 66 having a pair of air escape channels 68 extending longitudinally therethrough. A key 70 is tightly received in a keyway 72 to extend longitudinally along and outwardly from the first tool mounting portion 62 as is considered to be conventional. The outwardly protruding portion of key 70 is closely slideably received in keyways 73 included in tool members 74 and spacer members 76 and in keyway 48 in the holder body. Second shaft mounting portion 64 includes an elongated threaded area 78 extending inwardly along the shaft from the outermost end, the use of which will hereinafter be described in detail.

Tool mounting shaft engaging means C is comprised of a nut-like element 90 having a first portion 92 of a diameter which will be closely slideably received in enlarged bore portion 28, a collar portion 94 having an outer dimension slightly greater than the diameter of enlarged bore portion 28, and a tightening portion 96 which may be conveniently dimensioned to receive a conventional wrench-type tightening device. Extending longitudinally through and coaxial with element 90 is a threaded bore 98 which permits element 90 to be conveniently threadably received over threaded area 78. A set screw 100 threadably extends through the side wall of tightening portion 96 into bore 98 to provide locating means for nut-like element 90 relative to threaded portion 78.

With particular reference to FIG. 3, mounting shaft biasing means E is shown as comprising a first biasing sleeve 110, a spring biasing member 112 and a second biasing sleeve 114. Sleeves 110, 114 each include a bore extending therethrough (not numbered) having a diameter of sufficient dimension to be closely slideably received over shaft 60. Further, sleeve 114 includes a circumferentially extending groove 116 therein adapted to receive set screws 42, 44 for retaining the sleeve in a desired position relative to the body. The biasing means in this embodiment of the invention acts to maintain a continuous biasing force against the mounting shaft longitudinally outward from the holder body.

Figure 5:
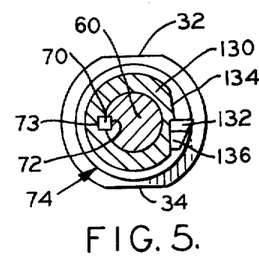
FIG. 5 is a cross sectional view taken along lines 5—5 in FIG. 2.
Figure 6:
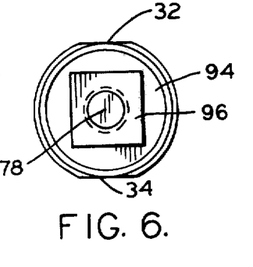
FIG. 6 is an end view of the tool holder of FIG. 3 taken in the direction of lines 6—6.

Each cutting tool member 74, FIG. 5, comprises a generally annular tool member mounting sleeve 130 and a cutting tool element 132. Again, sleeve 130 is dimensioned to be closely slideably received over shaft 60 and includes therein a keyway 73 to closely slideably fit over key 70. Tool element 132 includes the conventional cutting surfaces and may be manufactured from any convenient cutting tool material such as, for example, tool steel or carbide. Disposed immediately adjacent the front or leading edge of element 132 on sleeve 130 is a relief area 134 which permits chip flow therefrom during the actual metal removal operation. A back-up member 136 is positioned immediately to the rear of tool element 132 in order to provide rigidity for the tool member structure. Spacer members 76 may be of any desired length in order to desirably position the tool members and each includes thereon a relief area 140 to facilitate chip removal during the metal removal operation.

In using the above described tool holder, and with the tool holder structure in the unassembled condition, the tool and spacer elements 74, 76 are positioned over tool mounting portion 62 of shaft 60 from portion 64 as shown in the FIGURES. The distance between consecutive tool members 74 is, of course, established by the lateral dimensions of the associated spacers 76. Thus, when it is desired to have the tool member disposed in a particular relationship to one another, it is merely necessary to vary the size, i.e., length, of the spacers employed the spacer members being discrete entities, i.e., not being integral parts of the cutting tools. Also, if it is desired to use the holder with a single tool element, it is entirely possible to do so by merely arranging the tool element and spacers as particularly desired. In any event, the subject new structure provides a simple and versatile cutting tool member mounting arrangement. With the tool members and spacers on shaft 60, end collar 66 provides an abutting means or surface for establishing the desired rigid structure when the tool holder is assembled.

For assembly, the mounting shaft with the tool members and spacers previously positioned thereon is inserted into the holder body from end face 22 through bore 26. Sleeve 110, spring biasing means 112 and sleeve 114 respectively are then placed over the mounting shaft from threaded end portion 78. When properly positioned, set screws 42, 44 are threadably advanced so as to engage groove 116 on both sides thereof and retain sleeve 110, 114 and spring biasing means 112 in position in bore 26. The tool mounting shaft engaging means C is next threadably located over threaded portion 78 and advanced thereon until collar 94 engages second end face 24 of the holder body to axially draw shaft 60 further into the holder body. Once the tool and spacer members are drawn into a close or tight fitting side-by-side relationship with each other between end member 66 and first end face 22 and when collar 94 is closely received against second end face 24, the component parts of the tool holder are in proper location. In this condition, set screw 46 may be advanced against shaft 60 and set screw 100 may be advanced against threaded portion 78 so as to lock the component parts of the structure in the desired assembled condition. Keyways 73 in tool members 74 and spacer members 76 and keyway 48 in body 20 permit shaft 60 to have this axial movement but act to prevent rotational movement of mounting shaft 60 relative to the tool holder body and rotational movement of the tool and spacer members relative to the mounting shaft.

Once assembly of the holder is complete, the assembly may then be conventionally installed on a metal removal machine for effecting desired metal removal for cutting grooves into a workpiece.

Referring now to FIGS. 7–10, a variation of the tool holder which was hereinabove described is shown. This variation, although employing the same basic concepts, includes a slightly different holder body structure and further includes two additional refinements not shown in the structure of FIGS. 1–6. Accordingly, and with reference to this second embodiment, similar parts have similar primed numerals and new parts have new numerals.

Figure 7:
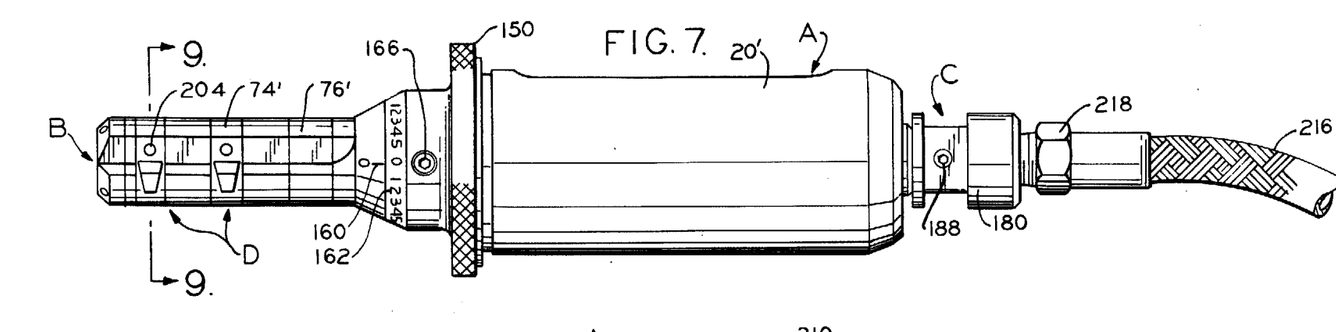
FIG. 7 is an alternative arrangement of the tool holder including the concepts of the subject invention.
Figures 8, 9, 10, 17, 18:
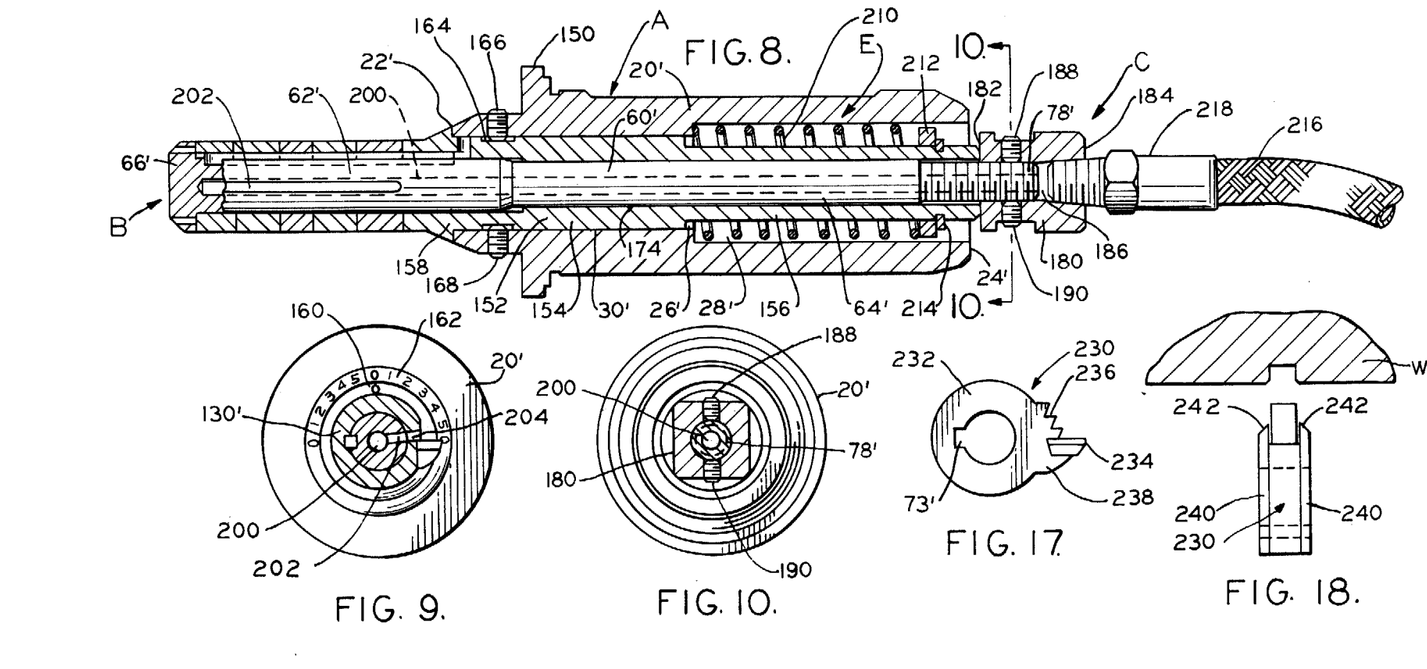

Specifically, and with particular reference to FIGS. 7 and 8, holder body 20' includes opposed end faces 22', 24' with a coaxial bore 26' extending therethrough. Bore 26' has an enlarged bore portion 28' extending inwardly from end face 24' and a smaller bore portion 30' extending inwardly from end face 22', again, portions 28', 30' meeting within body 20'. The holder body also includes a locating collar 150 extending circumferentially therearound, which collar may be used to abut the metal removal machine tool holder mounting facility as is known. In this arrangement, there is also provided an elongated inner holder body or biasing sleeve 152 having an enlarged diameter portion 154 and a smaller diameter portion 156. The larger diameter portion of this body is closely received in smaller bore portion 30' of holder body 20'. The inner holder body or biasing sleeve also includes a front collar 158 adjacent the outermost end of the larger diameter portion thereof which includes indicating means generally designated 160 thereon. In this instance, indicating means 160 comprises a position line and the numeral 0, although it will be appreciated that other convenient indicating means could be employed. Similarly, tool body 20' includes thereon adjacent end face 22' a plurality of indicating indicia 162. Although this indicia could be comprised of a number of different types of indicia, in the preferred embodiment described herein, the indicia is represented by numerals. The use of indicating means 160 and indicating indicia 162 will be more fully described hereinafter. The inner holder body includes a circumferentially extending recess or groove 164 spaced inwardly therealong from front collar 158 and holder body 20' includes a pair of set screws 166, 168 extending therethrough into smaller bore portion 30'. The positioning of groove 164 and set screws 166, 168 is such that they may be intermeshed for reasons and purposes which are hereinafter to be more fully described. Extending longitudinally through and coaxial with the inner holder body is a mounting shaft receiving bore 174.

In this second arrangement, the tool mounting shaft engaging means C is comprised of a threaded element generally designated 180. This element includes a front face 182, a rear face 184 and a threaded mounting shaft receiving bore 186 having threads corresponding to threaded end portion 78' of the mounting shaft. A pair of set screws 188, 190 extend through the body of threaded element 180 into bore 190 to permit convenient retention of the threaded element in position on the mounting shaft as will hereinafter be more fully described.

Also in this arrangement, mounting shaft 60' includes a fluid channel 200 extending substantially longitudinally therethrough from threaded portion 78' to end collar 66'. Further, an elongated fluid escape channel 202 is disposed in the side wall of mounting shaft 60' at least along a section of the first tool mounting portion 62'. Likewise, tool members 74' each include a fluid escape orifice 204 extending radially outward through the tool member mounting sleeve 130' immediately adjacent the front edge of the tool element itself.

In this particular arrangement, the mounting shaft biasing means E is comprised of, and in addition to sleeve 152, a coiled spring biasing means 210 and a biasing retaining collar 212. The spring biasing means has a diameter slightly less than the diameter of large bore portion 28' but greater than the diameter of small bore portion 30' in order that it may be seated against the collar or step defined by the intersection of these two bore portions. Retaining collar 212 is generally annular in shape having an outside diameter also slightly less than bore portion 28' and an inside diameter which permits it to be closely slideably received over smaller diameter portion 156 of the biasing sleeve. A convenient type collar locking member 214 is also received on smaller diameter portion 156 and, in the preferred embodiment, comprises a snap-ring type arrangement which is considered to be conventional. The biasing means acts to retain a constant longitudinal spring biasing force on the mounting shaft relative to the holder body. Finally, a fluid supply hose 216 having a standard pipe-type coupling 218 at one end thereof is threadably received in shaft receiving bore 190 of threaded element 180 from rear face 184.

In using the arrangement shown in FIGS. 7–10, tool members 74' and spacer members 76' are located on tool member mounting shaft 60' as was hereinabove discussed with reference to FIGS. 1–6. Thereafter, inner holder body 152 is placed over shaft 60' from end 64' and this assembly then inserted into bore 26' of holder body 20' from first end face 22' with front collar 158 closely positioned against end face 22'. Set screws 166, 168 may be threadably advanced inwardly so as to engage circumferentially extending groove 164. Next, the spring biasing means is inserted into the annular channel-like area defined between the outer peripheral surface of smaller diameter portion 156 and the inner peripheral surface of bore portion 28'. Then, biasing retaining collar 212 is locked in position by locking member 214. In this arrangement, the spring biasing means exerts a constant pressure against collar 212 so as to force or pull the mounting shaft axially into holder body 20'. To secure the mounting shaft and tool elements in position and to lock the remainder of the component parts as desired, threaded element 180 is next threaded onto threaded end portion 78' until front face 182 engages the rear face of inner holder body 152. Set screws 188, 190 are then advanced inwardly to tightly engage threaded portion 78'. This assembly is then ready for use with a metal removal machine similar to the arrangement shown in and described with reference to FIGS. 1–6.

In addition, however, cooling fluid supply hose 216 may be affixed to the tool holder at threaded element 180 via coupling 218 so that a continuous cooling or cutting fluid supplied thereby will pass through fluid channel 200, outwardly through elongated fluid escape opening 202 and outwardly through fluid escape orifices 204 to contact the workpiece and cutting element itself. The general concept of supplying either cooling or cutting fluid to a workpiece during a metal removal operation is deemed to be well known in the art and further elaboration thereon is not considered necessary.

As a further feature of this second embodiment, set screws 166, 168 and threaded element 180 may be backed off slightly from their normal retaining positions to permit rotation of the inner holder body, tool mounting shaft and tool members relative to holder body 20'. As shown in FIG. 7, indicating means 160 and indicating indicia 162 show the zero or normal position between these elements. However, the availability of movement as hereinabove discussed presents several advantages in that, and for example, as the tool elements themselves are continuously used, they become dull and must periodically be re-sharpened or reground. Of course, when re-sharpening is effected, the distance which the tool element extends radially outward from the mounting shaft is slightly decreased. If a machine operator knows the amount of material removed from the tool elements during sharpening, he can rotate the tool elements, i.e., tool elements, mounting shaft and inner holder body relative to holder body 20' until indicator means 160 is opposite the indicating indicia 162 which would indicate the amount of material removed during sharpening. Then, as the tool holder itself is re-located and mounted on the metal removal machine, the difference in the tool element dimensions is compensated for by the rotated position thereof to permit the same cut or groove to be achieved with a minimum of machine adjustment.

Also, the indicating means and indicating indicia present means whereby the tool members may be relocated during a machining operation so as to provide ease of accomplishing a particularly desired cut or groove. Of course, the indicating indicia could be so established as to indicate any desired variation of relative movement between the indicator means and indicating indicia; however, it has been found that indications of distance such as, for example, in thousandths of an inch, have proved most desirable.

Referring now to FIGS. 17 and 18, there are shown variations of the tool members which may be employed with the tool holders shown in FIGS. 1–10. In these arrangements, the tool member is generally designated 230 and may be said to comprise a tool mounting sleeve 232 and a cutting tool element 234. Disposed immediately in front of the tool element is a generally saw toothed chip-breaking area 236 and disposed immediately to the rear of the tool element is a back-up area 238. This back-up area may be integral with or separate from sleeve 232 and is to provide strength and rigidity for the tool element during the cutting operation. Likewise, chip-breaker recess 236 may be comprised of other configurations although the saw toothed type arrangement has been found to be most successful. Again, tool element 234 may be constructed from any known metal removal material such as, for example, tool steel or carbide.

FIG. 18 shows a slight variation of the hereinabove described tool member arrangement which permits chamferring of a groove in a workpiece W. In this arrangement, a disc or sleeve member 240 is disposed on each side of tool member 230. These discs or sleeves include means which permit them to be placed over the mounting shaft and retained thereon similar to the means hereinabove discussed relative to the tool members themselves. These sleeves also include cutting surfaces 242 disposed angularly relative to the cutting surface of tool element 234 in order to achieve the chamferring effect. Because of the structure of the tool holders, the chamferring tools may be so disposed to chamfer any groove on either one side of both sides thereof as may be particularly desired.

Figure 11:
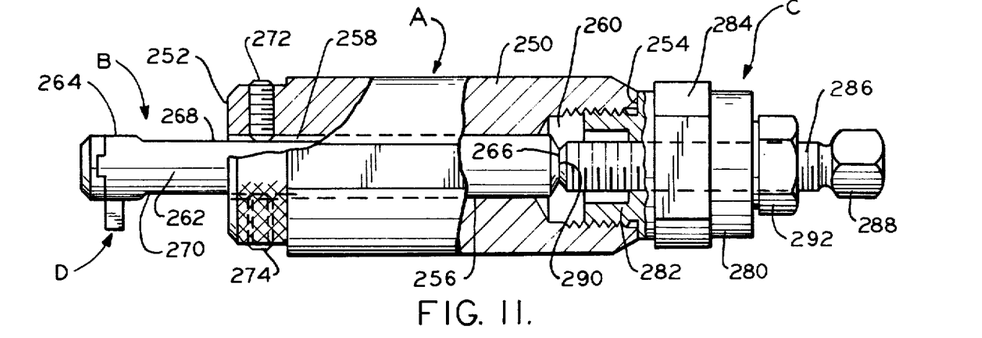
FIG. 11 is a partial sectional view of yet another arrangement of the the tool holder incorporating the concepts of the subject invention.

Two additional arrangements employing the concepts of the subject invention are shown in FIGS. 11–16. With particular reference to FIG. 11, there is shown an embodiment which permits longitudinal adjustment of the cutting tool when it may be desired by the machine operator. For sake of clarity and description, these embodiments are provided with new numerals although the terminology employed in description thereof remains substantially identical as that for the embodiments shown in FIGS. 1–10. In FIG. 11, there is provided a tool holder body 250 having a first end face 252 and a second end face 254. A tool mounting shaft 256 extends longitudinally and generally coaxially through body 250 and includes a smaller diameter portion 258 and a larger diameter portion 260. The tool holder body includes locating and mounting flats thereon as hereinabove described with reference to the other embodiments and as is deemed conventional in the art.

The tool member mounting shaft 262 includes a tool mounting portion 264 and an adjustment portion 266. Disposed adjacent portion 264 to extend generally longitudinally along at least a part of the shaft are a pair of opposed flats 268, 270, the use of which will hereinafter become apparent. A pair of set screws 272, 274 are threadably received in tool holder body 250 adjacent first end face 252 for selective extension into bore 256 and a clamping contact with flats 268, 270 respectively.

Tool mounting shaft engaging means C is comprised of an engaging member 280 having a threaded end portion 282 adapted to be threadably received in larger diameter bore 260. An adjustment portion 284 permits the engaging member to be tightened against holder body 250 at end face 254 thereof. An elongated tool member mounting shaft adjustment member or screw is threadably received in and extends through engaging member 280 and includes an adjustment portion or head 288 and a mounting shaft contact end 290. A locking nut 292 received between adjustment portion or head 288 and engaging member 280 provides easy means for locking the adjustment screw in a particular desired position.

In this arrangement, only a single cutting tool member D is employed as will hereinafter be more fully explained. Also, and with the tool holder in the assembled condition as shown in FIG. 11, by simply loosening slightly set screws 272, 274 from their close-fitting locking engagement with flats 278, 270, tool mounting shaft 262 will be permitted to move longitudinally within bore 256 relative to the tool holder body itself. To effect outward movement, it is merely necessary to "back-off" locking nut 292 and then advance adjustment screw 286 as desired by means of adjustment portion or head 288. Set screws 272, 274, although being retracted slightly from tight-fitting engagement against flats 268, 270 respectively, will prevent rotational movement of the mounting shaft during the axial movement. After the tool member has been advanced the amount desired, it is only necessary to re-tighten set screws 272, 274 and locking nut 292 in order to retain the cutting tool member in the position desired. Thus, if the amount of advance of adjustment screw 286 is known, the machine operator can effect outward movement of the cutting tool member as desired by turning adjustment screw 286 the required amount. To retract the shaft, however, it is necessary to push the shaft inwardly once the adjustment screw has been backed off a desired distance.

Although it may be considered somewhat basic, the above particular embodiment shows an inexpensive, although useful, adaptation of the concepts of the subject invention into a cutting tool holder particularly adapted for use in grooving operations.

Figure 12:
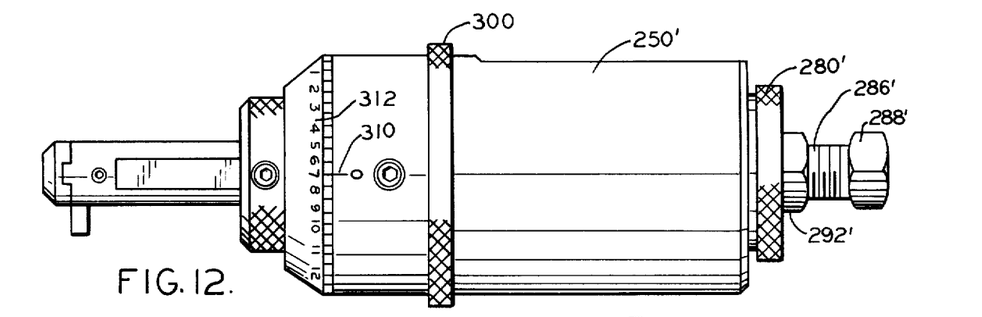
FIG. 12 is a side elevation of still a further tool holder incorporating the concepts of the subject invention.
Figure 13:
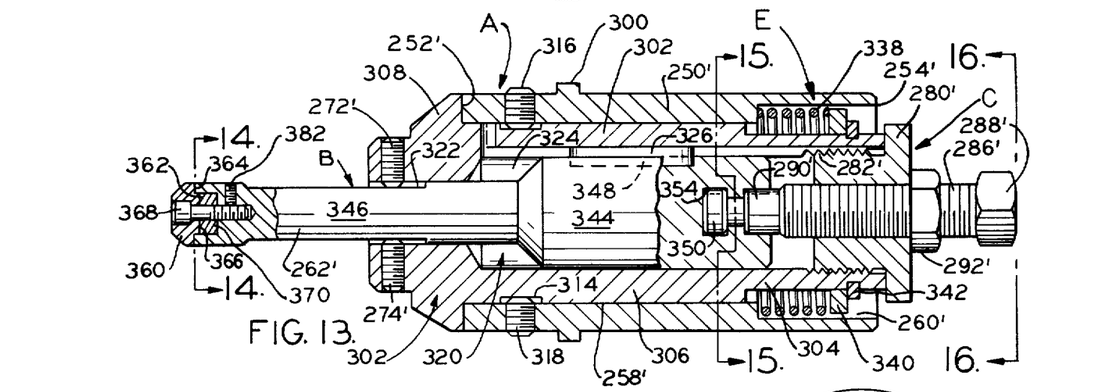
FIG. 13 is a longitudinal cross sectional view of the tool holder shown in FIG. 12.

Referring now to FIGS. 12 and 13, a more sophisticated arrangement which permits axial adjustment of the tool member is shown. In this arrangement, and for the sake of clarity and appreciation of operation, similar components have similar primed numerals and new components have new numerals. Tool holder body 250' has opposed end faces 252', 254'. Also, disposed about the outer periphery of the tool holder body is a locating or retaining collar 300 which conventionally permits precise location of the tool holder. Dimensioned to be closely received in bore 258' is an elongated inner tool holder body or biasing sleeve 302 having a smaller diameter portion 304 and an enlarged diameter portion 306. A front collar 308 for this inner holder body is dimensioned so as to be closely received against end face 252'. Disposed on body 250', adjacent end face 252', is an indicating means and disposed on front collar 308 are indicating indicia 312 which may be similar or identical to the indicating means-indicating indicia arrangement hereinabove previously described. Disposed inwardly from the front collar on the inner tool holder body or biasing sleeve is a circumferentially extending recess 114. A pair of set screws 116, 118 which are threadably received in the side walls of tool holder body 250' may be threadably advanced inwardly therethrough into bore 256' for selective engagement in groove 314 to axially locate the inner tool holder body or biasing sleeve relative to the main or outer tool holder body. The inner tool holder body includes a mounting shaft receiving bore 320 extending longitudinally and coaxially therethrough having a smaller diameter portion 322 and a larger diameter portion 324. Disposed to extend outwardly from and longitudinally along a portion of bore 324 is a key 326 which is adapted to be closely slideably received in a keyway disposed in the tool member mounting shaft as will hereinafter be more fully described.

This arrangement of the subject invention also employs a mounting shaft biasing means E which, in addition to sleeve 302, is comprised of a coiled spring biasing means 338 received between the inner periphery of bore 260' and the outer periphery of smaller diameter portion 304 of the inner tool holder body. A biasing means retainer collar 340 and associated collar locking member 342 are provided to be disposed over the end of the inner tool holder body or biasing sleeve much the same as hereinabove previously described with reference to the embodiment shown in FIGS. 7–10.

The tool member mounting shaft 262' includes an elongated larger diameter portion 344 and an elongated smaller diameter portion 346. At least the larger diameter portion is dimensioned so as to be closely slideably received in bore 324 and this portion also includes a conventional keyway 348 extending longitudinally therealong for close-fitting sliding cooperation with key 326 so as to prevent relative rotation between the shaft and the inner tool holder body but permitting relative axial movement therebetween.

In this arrangement, shaft adjusting screw 286' includes a contact end protuberance 350 extending axially outward from contact end 290'. This protuberance is slideably received in a slot 352 (FIG. 15) disposed in the end of the tool member mounting shaft into a protuberance receiving area 354 so as to establish a strong mechanical connection between the shaft and adjusting screw which also permits relative rotation therebetween for adjustment purposes.

In the arrangement shown in FIGS. 12 and 13, operation is much the same as that hereinabove described with reference to FIG. 11 excepting that a constant biasing force is maintained on the inner tool holder body so as to draw it axially into tool holder body 250' and that this embodiment also permits selective rotation between the inner tool body, cutting tool member and tool mounting shaft relative to the main tool holder body 250' with indicating means to show the amount or degree of movement from a first normal position. Also in this arrangement, shaft adjustment screw 286' can be used to move the tool mounting shaft both axially outward and inward of the tool holder body.

As may be seen, the embodiments of the invention shown in FIGS. 11-13 are used with a single end mounted cutting tool member. In both of these arrangements, the tool mounting shaft includes a tool member end retaining cap 360 at the outermost end of smaller diameter portion 346 which is dimensioned to be disposed over a tool receiving recess 362 in the end of the shaft itself. The cap and recess include interfitting lips 364 and grooves 366 in order to provide a locking relationship therebetween. An elongated retaining screw 368 passing through cap 360 and threadably received in portion 346 facilitates attachment of the cap to the shaft.

Figure 14:
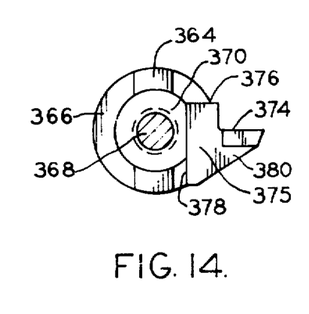
FIG. 14 is a cross sectional view taken along lines 14—14 in FIG. 13.
Figure 15:
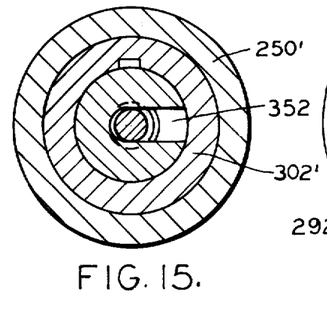
FIG. 15 is a cross sectional view taken along lines 15—15 in FIG. 13.
Figure 16:
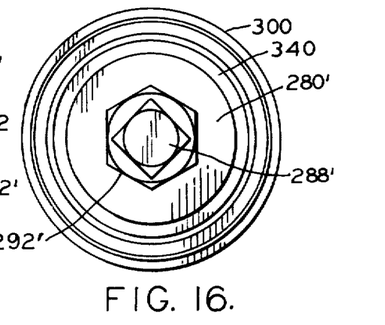
FIG. 16 is an end view of the tool holder shown in FIG. 12 taken in the direction of lines 16—16.

With particular reference to FIGS. 13 and 14, the cutting tool member D is shown as being comprised of an annular tool mounting sleeve 370 and a tool element 374 received on a tool element mounting base 375 which, in turn, is affixed to the tool mounting sleeve. The tool element mounting base includes a pair of support lips or ledges 376, 378 which engage tool receiving recess 362 to provide rigidity and strength for the tool element mounting during a machining operation. Disposed immediately behind tool element 374 is a back-up area or portion 380 which provides further rigidity and strength for the tool element. Finally, a locking screw 382 is included in smaller diameter portion 346 of the tool mounting shaft adjacent the tool receiving recess for selective locking engagement with retaining screw 368. As best seen in FIG. 14, the recess formed in the end of the tool mounting shaft is congruent with the periphery of annular tool mounting sleeve 370 and a portion at least of tool element mounting base 375, so that the cutting tool member is tightly and supportatively received within the recess. Again, and as hereinabove previously described, tool element 374 may be manufactured from any convenient cutting material generally associated with metal removal work such as, for example, tool steel or carbide. This arrangement provides a simple tool member mounting structure which permits easy and precise removal and relocation of a tool member in the tool holder without the necessity of disturbing the tool holder mounting.

The invention has now been described with reference to the preferred embodiment and variations thereof. Obviously, other modifications and alternations will occur to others upon the reading and understanding of this specification. It is my intention to include all such modification and alteration insofar as they come within the scope of the appended claims or the equivalents thereof.

Having thus described my invention, I now claim:

1. A new tool member and tool holder for use therewith of the type including an elongated holder body adapted to be affixed to a conventional metal removal machine, said body having an elongated tool mounting shaft extending coaxially outwardly from said holder body, said tool mounting shaft including a front end face disposed generally normally to said mounting shaft and a tool member receiving recess extending longitudinally inwardly from said front end face, said recess including a circular wall portion extending longitudinally into said mounting shaft and a single slot opening from said circular wall radially through said mounting shaft, said slot having planar walls at right angles to one another and intersecting said circular wall portion at circumferentially spaced locations thereabout, said tool member including:

a circular mounting portion dimensioned to be received within said circular portion of said recess in a desired axial position relative to said mounting shaft and a tool element portion rigidly affixed to said mounting portion and extending generally radially outward therefrom through said slot, said tool element portion including a tool cutting area generally disposed at the outermost radial surface thereof and planar sides disposed in said slot in facial engagement with said planar walls of said slot to prevent rotation of said tool member relative to said mounting shaft, and a retaining cap dimensioned to be received over said recess and said tool member and attached to said shaft in locking relationship thereto.

2. The tool member and tool holder of claim 1, wherein said front end face has lips formed thereon and said retaining cap has a groove formed therein which lips and which groove interfit one with the other to provide a locking relationship therebetween.

3. The tool member and tool holder of claim 2 wherein said retaining cap is secured to said tool mounting shaft by a retaining screw passing through said cap and said cutting tool member into said shaft.

4. A cutting tool holder for maintaining a plurality of cutting tool members in a desired spaced relationship thereto as said tool members are selectively engaged with a workpiece for performing a cutting operation, said holder comprising:

an elongated holder body having a longitudinal axis and first and second spaced apart end faces, said holder body further including a first coaxial bore extending therethrough, said body being adapted to be readily affixed to a conventional metal removal machine;

an elongated tool mounting shaft having: (1) a first tool mounting portion including means for affixing said plurality of tool members thereto so as to prevent rotational movement between said tool members and said shaft; and, (2) a second shaft mounting portion receivable in said first bore from said first end face to extend substantially longitudinally through said holder body;

discrete spacing means receivable on said tool mounting shaft for locating and retaining said tool members at spaced intervals thereon;

means for engaging said second shaft mounting portion to retain said tool mounting shaft in a desired position within said bore;

means for selectively preventing rotational movement of said mounting shaft relative to said body, means received in said first bore of said body over said mounting shaft for continuously placing a biasing force against said mounting shaft longitudinally of said holder body, said mounting shaft mounting portion including a threaded portion, said engaging means including means for threadably receiving said threaded portion, the force of said engaging means as it is threadably received on said threaded portion overcoming said biasing force, and said biasing means comprising a first biasing sleeve dimensioned to be closely slideably received over said mounting shaft in said first bore against said tool mounting portion; a second biasing sleeve dimensioned to be closely slideably received over said mounting shaft in said first bore; a spring biasing means dimensioned to be received in said first bore over said mounting shaft between said first and second biasing sleeves; and, means for selectively locking said second biasing sleeve at a predetermined position within said bore with said spring biasing means in a condition of compression.

5. The tool holder as defined in claim 4 wherein each said tool member comprises a generally annular tooling mounting sleeve having a tool element affixed thereto, said annular sleeve having an internal diameter for permitting said sleeve to be closely slideably received over said first tool mounting portion and including means for locating said tool element on the outer peripheral surface of said mounting sleeve to extend generally radially outward thereof.

6. The tool holder as defined in claim 5 wherein said locating means comprises tool element receiving notch and a tool element back-up element adjacent thereto for providing rigidity for said tool element.

7. The tool holder as defined in claim 6 further including workpiece chip relief area adjacent said notch on the other side thereof from said back-up element.

8. The tool holder as defined in claim 4 wherein said locking means comprises at least one threaded element extending through the side wall of said holder body into said first bore for selective retaining engagement with said second biasing sleeve.

9. A cutting tool holder for maintaining a plurality of cutting tool members in a desired spaced relationship thereto as said tool members are selectively engaged with a workpiece for performing a cutting operation, said holder comprising:

an elongated holder body having a longitudinal axis and first and second spaced apart end faces, said holder body further including a first coaxial bore extending therethrough, said body being adapted to be readily affixed to a conventional metal removal machine;

an elongated tool mounting shaft haivng: (1) a first tool mounting portion including means for affixing said plurality of tool members thereto so as to prevent rotational movement between said tool members and said shaft; and, (2) a second shaft mounting portion receivable in said first bore from said first end face to extend substantially longitudinally through said holder body;

means for engaging said second shaft mounting portion to retain said tool mounting shaft in a desired position within said bore, said engaging means including a threaded portion on said mounting portion of said mounting shaft, and a collar threadably receiving said thread means and engaging said second end face of said holder body, and means biasing said mounting shaft in the direction from said second end face toward said first end face, said biasing means including a first biasing sleeve dimensioned to be closely slideably received over said mounting shaft in said first bore against said tool mounting portion; a second biasing sleeve dimensioned to be closely slideably received over said mounting shaft in said first bore; a biasing spring dimensioned to be received in said first bore over said mounting shaft between said first and second biasing sleeves; and, means for selectively locking said second biasing sleeve at a predetermined position within said bore with said biasing spring in a condition of compression.

* * * * *